(12) United States Patent
Fax et al.

(10) Patent No.: US 7,620,464 B2
(45) Date of Patent: Nov. 17, 2009

(54) METHOD FOR OPERATING A PROCESS PLANT, PROCESS PLANT AND COMPUTER PROGRAM PRODUCT

(75) Inventors: Martin Fax, Langenzenn (DE); Oliver Thurau, Limburgerhof (DE); Helmut von Au, Dettenheim (DE)

(73) Assignee: Siemens Aktiengesellschaft, Munich (DE)

( * ) Notice: Subject to any disclaimer, the term of this patent is extended or adjusted under 35 U.S.C. 154(b) by 178 days.

(21) Appl. No.: 11/803,377

(22) Filed: May 14, 2007

(65) Prior Publication Data

US 2008/0004723 A1    Jan. 3, 2008

(30) Foreign Application Priority Data

May 12, 2006   (EP)  .................................. 06009891

(51) Int. Cl.
  *G05B 11/01*  (2006.01)
  *G05B 9/02*   (2006.01)
(52) U.S. Cl. ................................ 700/80; 700/9; 700/12; 700/83; 340/506; 340/825.06; 702/183
(58) Field of Classification Search .................. 340/3.1, 340/3.7, 506, 825.06; 700/9, 10, 12, 23, 700/40, 83; 376/259; 717/177; 702/183, 702/187; 707/1, 201
  See application file for complete search history.

(56) References Cited

U.S. PATENT DOCUMENTS

| | | | | |
|---|---|---|---|---|
| 4,975,865 A * | 12/1990 | Carrette et al. | ................ | 700/10 |
| 5,325,522 A | 6/1994 | Vaughn | | |
| 5,375,150 A * | 12/1994 | Scarola et al. | ............... | 376/216 |
| 5,394,447 A * | 2/1995 | Scarola et al. | ............... | 376/259 |
| 5,631,825 A * | 5/1997 | van Weele et al. | ............ | 700/83 |
| 6,492,901 B1 * | 12/2002 | Ridolfo | ...................... | 340/506 |
| 7,076,312 B2 * | 7/2006 | Law et al. | ...................... | 700/23 |
| 7,120,558 B2 * | 10/2006 | McIntyre et al. | ............ | 702/183 |
| 2005/0096872 A1 * | 5/2005 | Blevins et al. | ............. | 702/183 |
| 2007/0174225 A1 * | 7/2007 | Blevins et al. | ................ | 706/60 |

FOREIGN PATENT DOCUMENTS

DE    10 2004 016 929 A1    11/2004

OTHER PUBLICATIONS

Jan Eric Larsson, Bengt Öhman, Christer Nihlwing, Håkon Jokstad, Liv Iren Kristianssen, Jon Kvalem, and Morten Lind, "Alarm Reduction and Root Cause Analysis for Nuclear Power Plant Control Rooms", pp. 1-11, XP002313688.

(Continued)

*Primary Examiner*—Ramesh B Patel
*Assistant Examiner*—Douglas S Lee (57) ABSTRACT

A method for operating a process plant, in which at the process level a number of items of alarm information are generated to display improper operating procedures of the process plant, has a defined number of process states of the process plant, wherein each process state is correlated with the total of all items of alarm information that can be generated. A first value or a second value is allocated as the correlation value to each pair formed from a process state and an item of alarm information.

A current operating state of the process plant is determined

As a function of the determined process state, items of alarm information are not displayed to which the first value has been allocated as the correlation value.

18 Claims, 3 Drawing Sheets

OTHER PUBLICATIONS

Michael Bray, Daniel Corsberg, "Practical Alarm Filtering, An expert system-based alarm filtering method prioritizes and reduces the number of alarms facing an operator", INTECH Engineer's Notebook, Feb. 1994, pp. 34-36, XP009014395.

Arne Henningsen, Jeffrey P. Kemmerer, Intelligent Alarm Handling in Cement Plants-Lessons Learned from the Nuclear Industry, IEEE, 1993, pp. 165-182, XP10111092.

* cited by examiner

METHOD FOR OPERATING A PROCESS PLANT, PROCESS PLANT AND COMPUTER PROGRAM PRODUCT

CROSS REFERENCE TO RELATED APPLICATIONS

This application claims priority of European application No. 06009891.07 EP filed May 12, 2006, which is incorporated by reference herein in its entirety.

FIELD OF INVENTION

The present invention relates to a method for operating a process plant in which at process level a number of items of alarm information is generated to display improper operating procedures of the process plant.

The present invention also relates to a process plant comprising a number of alarm signaling devices at process level which are constructed to generate a number of items of alarm information for displaying improper operating procedures of the process plant, and comprising an alarm display device for displaying items of alarm information. The present invention also relates to a computer program product for operating a process plant.

BACKGROUND OF INVENTION

In control and protection systems of process plants, for example in the chemical industry, the pharmaceutical industry or the oil/gas industry, automation systems are regularly used which in the event of improper operating procedures of the process plant, such as pressure drops, increases in temperature or the like, generate a large number of items of alarm information and pass them to a plant operator. In certain situations, for example when shutting down a process plant, this can lead to a flood of system-generated alarms which the operator can no longer control or command, and this can result in possibly serious accidents.

In control and protection systems of process plants, international associations, such as NAMUR (www.namur.de) therefore demand solutions that are capable of activating or deactivating specific alarms as function of the plant state and the combination of pending alarms (what is known as dynamic alarm processing). This should lead to a reduction in alarm occurrence and therewith allow the plant safety to be generally restored.

From the prior art, rigid, i.e. non-dynamic filtering of alarms is known in this connection in which specific filtering rules have to be explicitly indicated for each individual alarm that may be generated. Process-induced alarm states (sub-) plant states are not recognized by the system or are not dynamically taken into account.

Other known solutions allow filtering of alarms directly at the source of the alarm, i.e. at process level, by installation of an appropriate logic system. With a solution of this kind one particular disadvantage is that it is no longer possible to trace the fault. Alarms filtered at the source cannot be archived and are therefore unavailable for subsequent analyses or random evaluations at process control level.

Furthermore, what are known as alarm management systems in the form of designated, independent systems for alarm handling of process plants are known. Since they operate independently and irrespective of the process plant control system, they demand appropriate additional attentiveness on the part of the plant operator. Moreover, independent systems of this kind do not provide the convenience of a solution integrated in the plant operation nor are they capable of automatically taking account of changes in the plant control and protection system since, in particular, there is separate data storage and separate engineering.

SUMMARY OF INVENTION

An object underlying the invention is to disclose a process plant and a method for the operation thereof in which a reduction in alarm occurrence as a function of operating states of the plant is easily possible, wherein complete traceability of items of alarm information should be possible, and it should nevertheless be simple to operate the process plant.

The object is achieved with a method and a process plant stated in the independent claims.

According to the invention a method for operating a process plant, in which at process level a number of items of alarm information are generated to display improper operating procedures of the process plant, is characterized in that
a) a number of process states of the process plant is defined,
b) each process state is correlated with the total of all items of alarm information that can be generated, a first value or a second value being allocated as the correlation value to each pair formed from a process state and an item of alarm information,
c) a current operating state of the process plant is determined,
d) as a function of the determined process state, items of alarm information are not displayed to which the first value has been allocated as the correlation value.

According to the invention a process plant comprising a number of alarm signaling devices at process level, which are constructed to generate a number of items of alarm information for displaying improper operating procedures of the process plant, and comprising an alarm display device for displaying items of alarm information, is characterized by:
  at least one status module associated with a sub-group of alarm signaling devices and which is constructed to determine at least one current process state of the process plant from a number of defined process states,
  an alarm processing system at process control level which receives the generated items of alarm information and a status signal representing the determined process state and which is constructed to correlate each defined process state with the total of all received items of alarm information, it being possible to allocate a first value or a second value as the correlation value to each pair formed from a process state and an item of alarm information, the alarm processing system, as a function of the status signal, being constructed to control the alarm signaling device to hide items of alarm information to which the first value has been allocated as the correlation value.

The object is also achieved by a computer program product for operating a process plant, comprising program code sequences which, when executed in a process control system of the process plant, as a function of determined process state data of the process plant, are constructed to process items of alarm information generated at process level according to a method of the invention.

Advantageous embodiments of the present invention are the subject matter of the subclaims.

The proposed method of resolution integrates previous alarm suppression mechanisms with the possibility of dynamically determining, i.e. using determined process states, the relevance of items of alarm information in the form of process alarms and of thus hiding, i.e. not displaying, non-relevant process alarms.

For this purpose, in addition to the total of all process alarms, the alarm processing system of the process plant also detects the current process states in order to correlate them with the process alarms. In addition to the process alarms or items of alarm information generated at process level, process states of an automating process, or individual sub-processes in the case of functional division of the automation process, are also transmitted to the alarm processing system in the context of the present invention.

The alarm processing system decides, on the basis of a novel pair-wise correlation comprising a process state and an item of alarm information respectively and in connection with a respectively associated correlation value, which process alarms should be displayed with which process states and which should not be displayed. Non-relevant alarms can thus be hidden in alarm displays for the operator. As an alternative or in addition, hidden items of alarm information of acoustic and/or visual signal transmitters are not taken into account.

Since there is no suppression of items of alarm information at the source of the alarm, the hidden items of alarm information in particular may also be archived in an alarm journal for subsequent traceability by the operator for tracking purposes. According to the invention, the overall functionality of the alarm suppression mechanism outlined above can therefore be fully integrated into an existing process control system.

In a development of the method according to the invention it is provided that the correlation of process states and alarm information takes place in the form of at least one configuration matrix, a first dimension of the configuration matrix being formed by the defined process states and a second dimension of the configuration matrix being formed by the items of alarm information that can be generated, the correlation values constituting the entries in the configuration matrix.

A corresponding development of the process plant according to the invention provides that for correlating the process states and the items of alarm information the alarm processing system comprises at least one configuration matrix, a first dimension of the configuration matrix being formed by the defined process states and a second dimension of the configuration matrix being formed by the items of alarm information that can be generated, the correlation values constituting the entries of the configuration matrix.

According to the invention it is thus very easily possible to configure the alarm relevance without system and/or programming knowledge by making entries in the configuration matrix.

For safety reasons it is basically desirable to display all generated items of alarm information if state-contingent reasons do not argue against doing so, for example hiding of alarm information displaying the anticipated pressure drop is desirable when a plant is shut down. In a particular embodiment of the invention it is therefore provided that the second value (no hiding) is allocated as the correlation value by default.

To ensure traceability of operating states of the process plant it is provided according to a further development of the invention that as a function of the determined process state, at least the items of alarm information, to which the first value has been allocated as the correlation value, are archived in a storage device. However, all generated items of alarm information are preferably archived in the storage device irrespective or their current relevance.

For the purpose of being able to completely integrate the invention in existing process plants, it is in particular provided in developments of the invention that the process state is determined in step c) of the method according to the invention at process level and together with the total of all generated items of alarm information is transmitted at a process control level of the process plant, and in that the steps b) and d) are carried out in an alarm processing system at the process control level.

With a change in the process plant into a new process state, step d) of the method according to the invention is preferably executed again at the instant of the change, pending items of alarm information already generated being displayed as a function of the new process state.

Complete dynamic alarm suppression is thus possible.

In a development of the method according to the invention it is also provided that with incorrect determination of the process state in step c), all further generated items of alarm information are also displayed in subsequent step d).

To achieve increased plant safety it is thus ensured that with faulty operation of the alarm suppression according to the invention no generated items of alarm information are lost.

If an automation process carried out by the plant according to the invention is functionally divided into a plurality of sub-processes, a development of the invention provides that a number of sub-process states and a number of items of alarm information that can be generated, in the form of an alarm group, are allocated to each sub-process, and in that steps b) to d) of the method according to the invention are executed separately for each sub-process.

BRIEF DESCRIPTION OF THE DRAWINGS

Further properties and advantages of the present invention emerge from the following description of exemplary embodiments with reference to the drawings, in which.

DETAILED DESCRIPTION OF INVENTION

Figure 1:
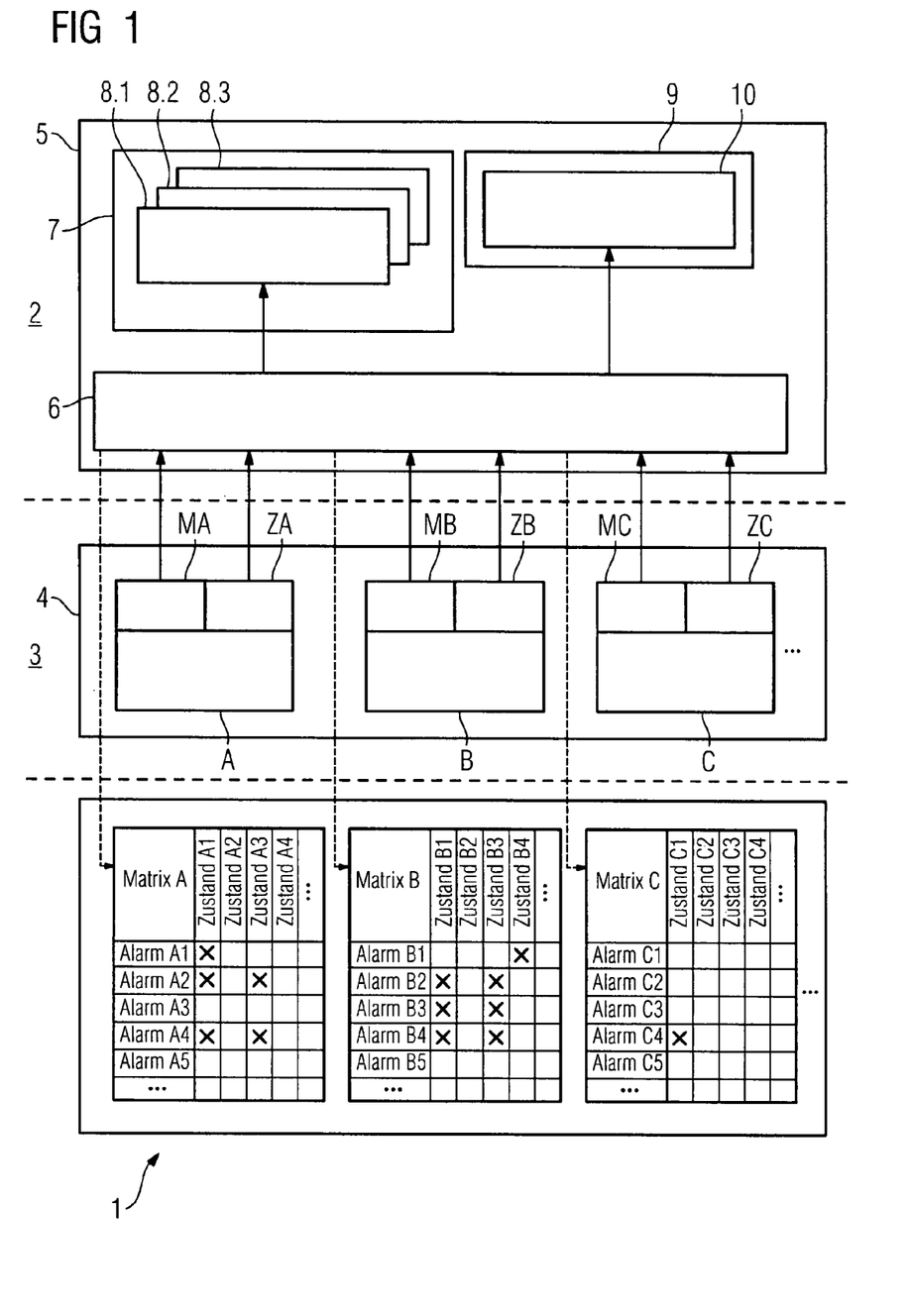
FIG. 1 shows a schematic block diagram of a process plant according to the invention.

FIG. 1 shows a process plant 1, for example for carrying out chemical or pharmaceutical processes or for processes in the oil/gas industry, the wood-processing industry, the paper industry or the like. A plant of this type basically has a process control level 2 and a process level 3, the actual automating processes, which are characteristic of the type and use of the process plant, being resident at the process level. FIG. 1 shows by way of example an automating process of this type provided with reference numeral 4.

At process control level 2, the process plant 1 according to the invention has an alarm system 5 which firstly comprises an alarm processing system 6, which in terms of software engineering is preferably constructed in a data processing device that is not explicitly illustrated. The alarm processing system 6 is actively connected to an alarm display device 7 which, in turn, comprises a number of alarm displays/alarm signal transmitters 8,1 to 8.3 which may for example be visual/optical alarm displays, such as lamps or screen windows, or acoustic alarm displays, such as horns or sirens. The alarm processing system 6 is moreover actively connected to a storage device 9 which in the present case is constructed for storing an archive file 10 in the form of what is known as an alarm journal.

At process level 3, the process plant 1 according to the invention has as components of the automating process 4 a series of sub-processes A, B, C which can each be identified with specific sub-processes of the automation process 4. Each of the three processes A to C comprises a series of process-engineering operating procedures, not explicitly shown, with which, in a process plant of the type shown in FIG. 1, monitoring equipment, in the form of pressure or temperature sensors or the like, is regularly associated, which monitors process states of the respective sub-process A to C. A number of alarm signaling devices is moreover regularly associated at the process level with monitoring equipment of this kind and are constructed for generating a number of items of alarm information to display improper operating procedures of the process plant or the respective (sub-)process, for example if a measured pressure drops severely.

From an alarm engineering perspective each of the sub-processes A to C shown in FIG. 1, or the alarm signaling devices provided within the framework of the relevant sub-process, can therefore also be designated an alarm group whose specific configuration in the case of the present invention will be discussed in more detail below with reference to FIG. 2.

Each of the sub-processes A to C or the corresponding alarm group cooperates with an announcement unit or module MA to MC and with a status unit or module ZA to ZC. The announcement modules MA to MC and the status modules ZA to ZC are in turn each actively connected in terms of signal engineering to the alarm processing system 6 of the alarm system 5.

As shown for reasons of clarity in the lower part of FIG. 1, the alarm processing system 6 contains a number of configuration matrices Matrix A, Matrix B, Matrix C. Each of the matrices is associated with one of the sub-processes A to C or the corresponding alarm group. A first dimension (columns) of the configuration matrices Matrix A, Matrix B, Matrix C is formed by pre-defined process states of the corresponding sub-process A to C. In FIG. 1 these process states are designated State $A_i$, State $B_i$, State $C_i$, where i=1, 2, . . . , N. N designates a maximum number of possible states per sub-process, where N can vary from sub-process to sub-process. The second dimension (rows) of the configuration matrices Matrix A, Matrix B, Matrix C is formed by the respective total of all items of alarm information that can be generated for the corresponding sub-process A to C. Each of the items of alarm information designated by Alarm $A_i$, Alarm $B_i$, Alarm $C_i$ in FIG. 1 corresponds in this case to the alarm signal of an alarm signaling device from the alarm group associated with the corresponding sub-process in each case. Each of the illustrated alarms is provided to display an improper operating procedure of the process plant or sub-process executed thereon.

As entries the configuration matrices Matrix A, Matrix B, Matrix C contain correlation values for correlating each process state State $A_i$, State $B_i$, State $C_i$ with the corresponding total of all items of alarm information Alarm $A_i$, Alarm $B_i$, Alarm $C_i$ that can be generated for the respective sub-process A to C. FIG. 1 shows the correlation values in the form of crosses "X" or empty (white) fields in the corresponding matrices. Each matrix entry relates to a pair formed from a process state and an item of alarm information. Accordingly a first value ("X") or a second value (white field) is allocated to each of these pairs as the correlation value.

As a function of a specific/determined process state of the process plant 1 or a corresponding sub-process A to C, the matrices Matrix A, Matrix B, Matrix C are used according to the invention to not display, i.e. to hide, the items of alarm information Alarm $A_i$, Alarm $B_i$, Alarm $C_i$, generated within the framework of this sub-process, to which the first value ("X") has been allocated as the correlation value. In other words: the "X" entries in the matrices Matrix A, Matrix B, Matrix C in FIG. 1 form a configuration of non-relevant process alarms as a function of a process state and are used by the alarm processing system 6 as a type of mask for hiding items of alarm information which are thus not displayed by means of the alarm display device 7.

Operation of the process plant 1 according to the invention will be described again hereinafter to recapitulate:

For operation of the process plant 1, i.e. to describe the operating procedures that are executed in sub-processes A to C, a series of states State $A_i$, State $B_i$, State $C_i$ are defined, such as start-up, normal operation, emergency shutdown, shutdown or the like. Each sub-process A to C or the associated alarm group also contains a series of alarm signaling devices which in the event of an improper operating procedure within the relevant sub-process generate corresponding alarm information or alarm signals Alarm $A_i$, Alarm $B_i$, Alarm $C_i$. Using the configuration matrices Matrix A, Matrix B, Matrix C it is established which process alarms are irrelevant in which state of a respective sub-process and therefore do not have to be displayed at process control level 2, even though they were generated at process level 3, for example by a siren being switched on or a warning message being displayed on a screen, as would be possible with the aid of the alarm display device 7.

In other words: in the event of improper operating procedures, corresponding items of alarm information are generated by the alarm group of the relevant sub-process A to C and are transmitted via the associated announcement module MA, MB, MC to the alarm processing system 6. At the same time the status modules ZA, ZB, ZC respectively associated with the sub-processes A to C (regularly/continuously) determine the current operating state of the sub-process and transmit this to the alarm processing system 6 too. The alarm processing system 6 therefore always knows in which process state a specific sub-process is. It can therefore be determined with the aid of the associated configuration matrix Matrix A, Matrix B, Matrix C and as a function of the respective process state of the sub-process which of the (pending) process alarms $A_i$, $B_i$, $C_i$ are relevant in the current state of the sub-process (white field in the matrix) and which are not ("X"). What is known as alarm hiding (hiding of pending items of alarm information) takes place solely at process control level by way of the alarm processing system 6 at which all items of alarm information generated by the alarm groups continue to be present. The alarm processing system 6 then decides with the aid of the configuration matrices which items of alarm information are displayed by the alarm display device 7 and which are not.

With the embodiment shown in FIG. 1 of the process plant 1 according to the invention, irrespective of a display of items of alarm information by means of the alarm display device 7, the alarm processing system 6 transmits all generated items of alarm information, i.e. all relevant and all non-relevant process alarms, to the storage device 9 or the alarm journal 10 kept therein, so irrespective of the display of items of alarm information it is possible to (subsequently) check the plant status at any time.

In relation to the process states, configuration of the relevance of an alarm for an operator of the inventive process plant thus takes place according to the invention simply and clearly via a matrix and, in particular, does not require any programming or system knowledge. It is sufficient if the configuration engineer who configured the plant with respect to its automating function has knowledge of the process. The illustrated grouping of all alarm-signaling functions of a sub-process into an alarm group also makes plant-wide alarm processing possible, which, as FIG. 1 shows, is associated with advantageous central data storage and persistence even in distributed systems.

Figure 2:
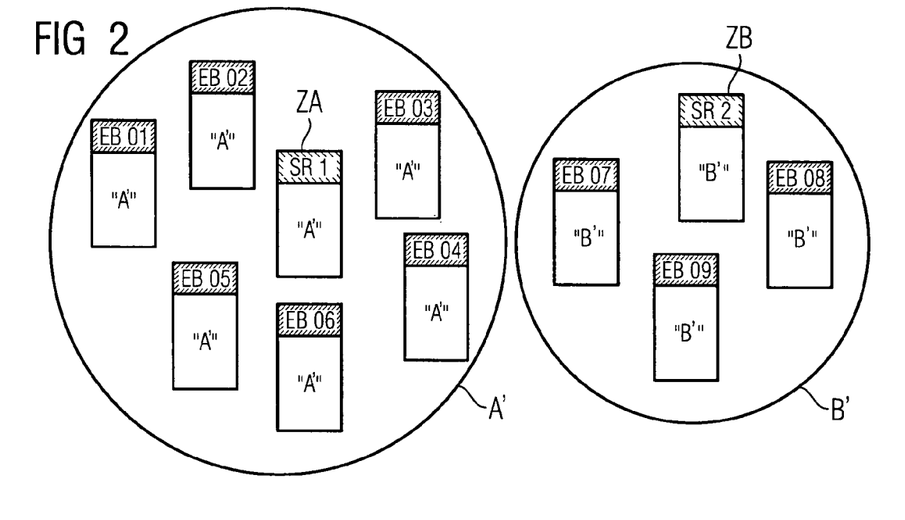
FIG. 2 shows a schematic diagram of a formation of alarm groups in the inventive process plant according to FIG. 1.

Using a schematic diagram, FIG. 2 shows the copying of all alarm-signaling functions (in the present case also called alarm-signaling devices) of a sub-process (cf. sub-processes A to C in FIG. 1) to give an alarm group associated with the sub-processes respectively. The individual alarm groups are shown in FIG. 2 by circular boundary lines and bear similar reference characters A', B' to the corresponding sub-processes in FIG. 1. Each alarm group A', B' contains a number of alarm signaling devices FB01 to FB06 and FB07 to FB09 which are each identified "A'" or "B'" as belonging to a corresponding alarm group A', B'. As has already been illustrated, the alarm signaling devices FB01 to FB09 generate items of alarm information to display improper operating procedures of the process plant, or of the sub-process associated with the respective alarm group, which are transmitted to the alarm processing system 6 by the associated announcement module MA to MC (FIG. 1).

In addition each alarm group A', B' in FIG. 2 also has a status module SR1 or SR2 which is also identified "A'", "B'" as belonging to the respective alarm group A', B'. As has already been illustrated with reference to FIG. 1, the status modules SR1, SR2, which correspond to the status modules ZA to ZC illustrated therein, are used to determine a (current) state of the relevant sub-process of the process plant and transmit this in standardized form to the alarm processing system 6 (FIG. 1). The status modules ZA to ZC or SR1, SR2 may therefore also be called status standardization modules.

As has already been described in detail above, these states are used according to the invention to decide, using the configuration matrices Matrix A, Matrix B, Matrix C, which generated items of alarm information should be displayed as a function of the specific process state and which should not.

Figure 3:
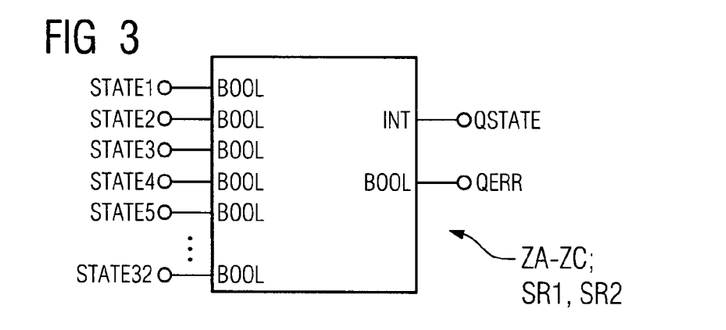
FIG. 3 shows, using a detailed diagram, a status module of the process plant according to FIG. 1.

FIG. 3 schematically shows a status module ZA to ZC or SR1, SR2 associated with a sub-process of FIG. 1 or 2. Items of information about the process state of a sub-process are made available to the status module in the form of Boolean input parameters which are designated STATE_XX in FIG. 3. In the course of the illustrated exemplary embodiment up to thirty-two input parameters may thus be predefined. The input parameters STATE_XX define (encode) a specific process state which is communicated to the status module by the control logic of a user program (not shown) for controlling the automating process 4 at process level 3 (FIG. 1). In the illustrated exemplary embodiment of the present invention up to thirty-two different process states of the process plant or the executed sub-processes A to C (FIG. 1) may thus be defined. The status module according to FIG. 3 converts the thus defined (encoded) state into an integer QSTATE in a value range from zero to thirty-two and transmits this in the form of a status signal representing the respective process state to the alarm processing system 6, as shown in FIG. 1.

If in the illustrated exemplary embodiment of FIG. 3 none of the linear input signals STATE_XX has a high logic level (1), the value zero results for the status signal QSTATE and at a further output QERR of the status module an error signal with low logic level (0) is output, and this indicates faultless operation of the status module (not of the process plant). In the event that more than one of the binary input signals STATE_XX have a high logic level (1), the value zero is again output as the status signal QSTATE and at the output QERR an error signal with high logic level (1) is generated.

The error signal QERR is also transmitted to the alarm processing system 6 in FIG. 1 although this is not explicitly shown therein. It is used by a higher-order controller of the alarm-hiding mechanism according to the invention, the configuration matrices Matrix A, Matrix B, Matrix C, described in detail with reference to FIG. 1, for hiding, i.e. for not displaying items of alarm information, only being used if QERR=0, i.e. if no error is signaled by a relevant status module ZA to ZC; SR1, SR2. In the opposite case the corresponding associated configuration matrix Matrix A, Matrix B, Matrix C is not used, rather for security all pending, generated items of alarm information are displayed for the relevant sub process and simultaneously archived.

Figure 4:
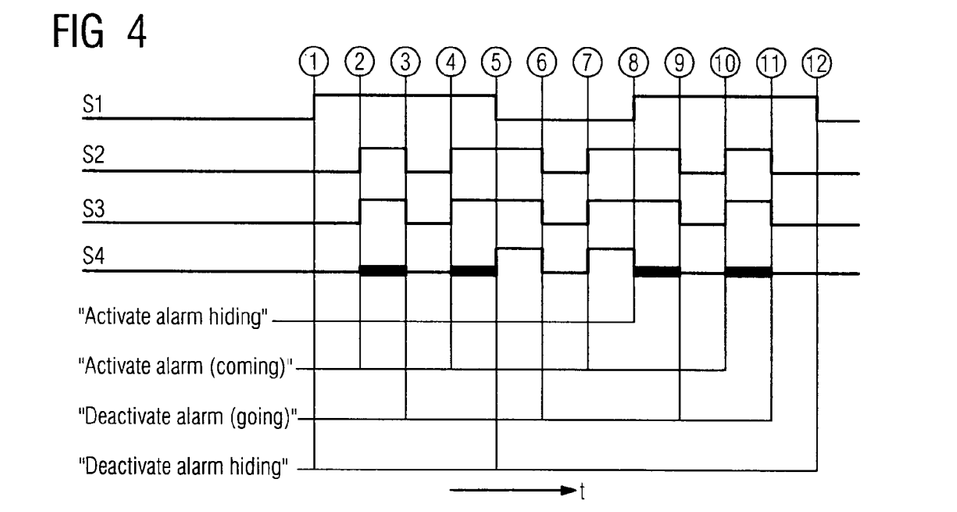
FIG. 4 shows a time sequence chart of the alarm behavior of a process plant operated according to an inventive method.

Using a time sequence chart, FIG. 4 shows the behavior of a process plant according to the invention during operation (runtime behavior). Illustrated is a number of signal characteristics S1 to S4 as a function of time t. Specific instants of the time sequence are also designated by digits for the purpose of easier identification and will be designated hereinafter according to this numbering by t1, t2, etc. Specific control commands for operating the process plant 1 (FIG. 1, or the alarm system 5 that exists therein) are also indicated in quotation marks in FIG. 4 and are associated with specific instants or signal transitions of signals S1 to S4 via dotted connecting lines. The signals S1 to S4 are binary signals which can be switched over between a high logic level (1) and a low logic level (0).

The control command "Activate alarm hiding" given in FIG. 4 is generated as a function of the configuration matrices Matrix A, Matrix B, Matrix C (FIG. 1) which are used for hiding framework information as a function of process states of the process plant. The command brings about a switchover of the corresponding signal S1 from a low to a high logic level at instants t1 and t8. As long as signal S1 is not switched back to the low logic level again ("deactivate alarm hiding"; instants t5, t12), the alarm-hiding mechanism proposed within the scope of the present invention is active. This may be understood in FIG. 4 with the aid of the signal characteristics S2 to S4 relating to the presence of items of alarm information in different regions of the process plant.

The signal characteristic S2 illustrates the presence or generation of at least one alarm or an item of alarm information at process level 3 (FIG. 1), for example by the alarm group A' (FIG. 2) belonging to sub-process A. According to FIG. 4 this alarm is generated between instants t2 and t3, t4 and t6, t7 and t9 and t10 and t11. Signal characteristic S3 shows the presence of this alarm in the alarm processing system 6 (FIG. 1). Since according to the invention there is no hiding or suppression of items of alarm information at process level 3 signal characteristic S3 corresponds exactly to signal characteristic S3 already described since each alarm generated at process level also arrives at process control level 2, i.e. in the alarm processing system 6, in the form of a corresponding item of alarm information.

Signal characteristic S4 indicates how the alarm processing system 6 (FIG. 1) acts when using a corresponding configuration matrix with the pending items of alarm information. Specifically signal characteristic S4 indicates whether the alarm information according to signal characteristic S2, S3 is displayed in alarm display device 7 (FIG. 1), and this is symbolized by a high logic level (1). Assuming that for the relevant alarm and as a function of a current process state a corresponding (first) correlation value ("X" in FIG. 1) is entered in the configuration matrix to be used, the pending alarm according to signal characteristic S4 is suppressed in the display, and this is symbolized in FIG. 4 by thicker horizontal bars, and is only displayed during the time from t5 to t8 since the alarm-hiding mechanism proposed within the scope of the present invention is deactivated (S1=0) during this time.

The control commands "activate alarm (coming)" and "deactivate alarm (going)" also indicated in FIG. 4 correlate with instants at which the relevant alarm is activated owing to an improper operating procedure or is deactivated again once a proper operating procedure has been resumed.

The alarm system 5 (FIG. 1) is thus able to recognize when the process plant or a sub-plant/sub-process changes its state, so pending alarms, which are no longer relevant in the new plant state according to the configuration matrices, are hidden. By contrast, hidden alarms, which are relevant in the new plant state, can be shown again.

The alarm system 5 (FIG. 1) advantageously also provides the possibility of displaying a list of all hidden alarms to a user. As an alternative or in addition a list of the alarms which are to be hidden if they were generated at the relevant instant of the (sub-) process can be displayed.

A timer function may moreover be provided in the alarm system 5 (FIG. 1) within the scope of the present invention, so when switching over into a new plant state, specific alarms, which are no longer relevant in this state but were relevant in a preceding state, are still tracked, i.e. are displayed, over a specific period, alarms of this kind only being hidden according to the invention after expiry of a timer present in the timer function.

Figure 5:
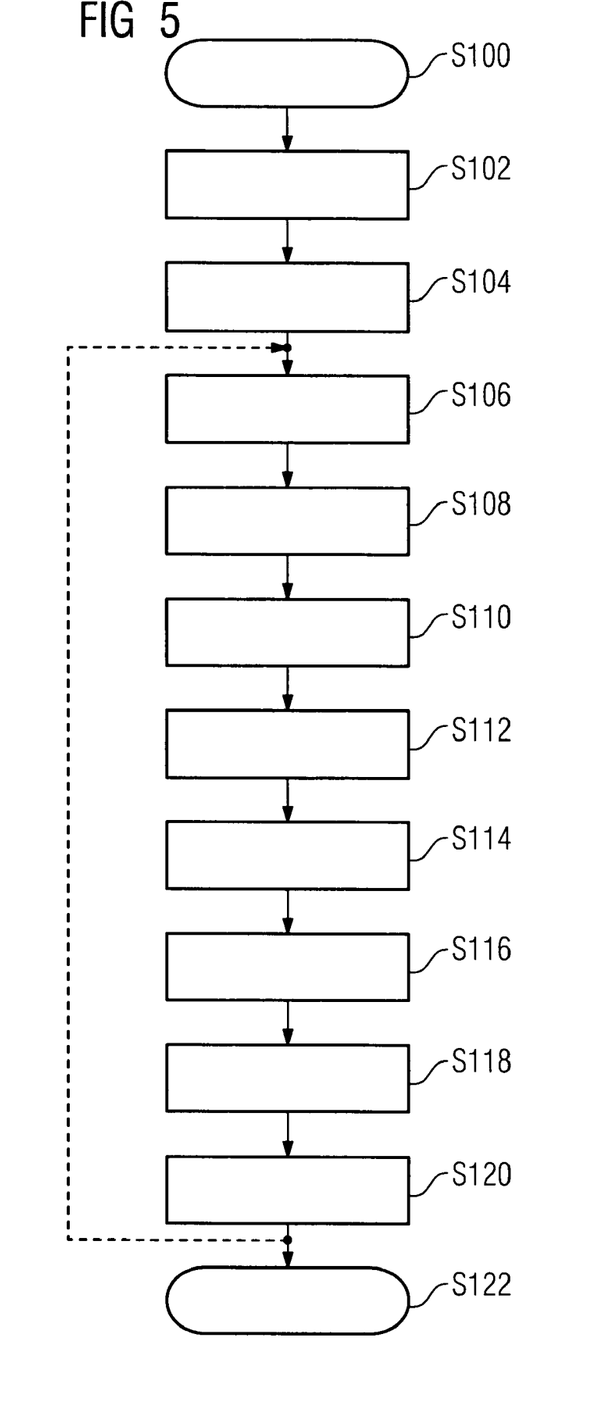
FIG. 5 shows a flow diagram of an embodiment of the method according to the invention.

FIG. 5 shows a flow diagram for illustrating an embodiment of the method according to the invention for operating a process plant, in particular the process plant 1 of FIG. 1.

The method begins in step S100. In a subsequent step S102 a number of process states of the process plant is defined. In particular a number of sub-processes can be defined at process level in step S102, a number of process states and a number of items of alarm information that can be generated, in the form of an alarm group, being associated with each sub-process.

Each (sub-) process state is subsequently correlated in step S104 with the total of all items of alarm information that can be generated, i.e. all items of alarm information that can be generated in connection with the relevant (sub-)process, a first value or a second value being allocated as the correlation value to each pair formed from a process state and an item of alarm information. According to the invention correlation in step S104 preferably takes place in the form of at least one configuration matrix, as has already been described in detail above.

For the description below it is assumed that the alarm-hiding mechanism proposed within the scope of the present invention is activated (S1=1 in FIG. 4).

A current operating state or sub-operating state of the process plant is determined in step S106.

The determined state is transmitted to the alarm processing system at process control level (step S108) by a corresponding status module. At almost the same time an error signal (cf. FIG. 3) is also transmitted in step S110 to the alarm processing system. In the case of an improper operating procedure the alarm signaling device of at least one alarm group (FIG. 2) generates corresponding alarms or items of alarm information in step S112 which are transmitted in step S114 to the alarm processing system by an associated announcement module (FIG. 1). In step S116 the alarm processing system determines whether, according to the transmitted error signal, the proposed alarm-hiding mechanism is employed by using the configuration matrices.

In the present case it is assumed that this is the case. Specific items of alarm information are therefore hidden in subsequent step S118 owing to the correlation values contained in the matrices, non-hidden items of alarm information being displayed via the alarm display device. At almost the same time at least the hidden items of alarm information, but preferably all generated items of alarm information, are archived in step S120 in the storage device of the process plant.

The method ends in step S122. Alternatively, and in a practically-relevant manner, the method can however then return to step S120 after step S106, and this is indicated in FIG. 5 by a broken line. The current operating state of the process plant is accordingly then determined again in step S106, whereupon the method is repeated accordingly starting with step S108.

The invention thus allows recognition of sub-process states for the purpose of assessing the relevance of alarms in combination with or based on the correlation between sub-plant state and the total of all sub-plant alarms, this correlation advantageously being configured in the form of a matrix. Configuration of the alarm relevance in the process plant according to the invention is thus easily possible without system or programming knowledge.

The invention claimed is:

1. A method for operating a process plant, comprising:
   generating a plurality of alarm information at a process level to display improper operating procedures of the process plant;
   defining a number of process states of the process plant;
   correlating each process state with the total of generateble alarm information, wherein a process state and an alarm information is forming a pair;
   allocating a first value or a second value to each pair as a correlation value;
   determining a current operating state of the process plant; and
   disabling the display of the alarm information to which the first value is allocated based upon the determined process state.

2. The method as claimed in claim 1, wherein the process states and the alarm information are correlated based upon at least one configuration matrix.

3. The method as claimed in claim 2, wherein a first dimension of the configuration matrix is based upon the defined process states and a second dimension of the configuration matrix is based upon the generatable alarm information, wherein the correlation values constitute the entries in the configuration matrix.

4. The method as claimed in claim 1, wherein the second value is allocated as the correlation value by default.

5. The method as claimed in claim 1, wherein at least the alarm information allocated to the first value are archived in a storage device based upon the determined process state.

6. The method as claimed in claim 2, wherein all generatable alarm information are archived in a storage device.

7. The method as claimed in claim 1, wherein the process state is determined at a process level.

8. The method as claimed in claim 7, wherein the process state and all generated alarm information are transmitted to the process control level of the process plant.

9. The method as claimed in claim 8, wherein the correlation of each process state with the generatable alarm information, and the allocation of the first value or a second value to each pair as a correlation value is carried out in an alarm processing system at the process control level.

10. The method as claimed in claim 9, wherein the disabling of the display of the alarm information to which the first value is allocated is carried out in an alarm processing system at a process control level.

11. The method as claimed in claim 1, wherein the disablement displaying the alarm information to which the first value is allocated based upon the determined process state is redetermined, when the process state changes.

12. The method as claimed in claim 11, wherein generated alarm information are displayed based upon the new process state.

13. The method as claimed in claim 1, wherein all generated alarm information are displayed, if the process state is determined incorrect.

14. The method as claimed in claim 1, wherein a plurality of sub-processes are defined at the process level, wherein a number of sub-process states and a number of generadeable alarm information are allocated to each possible sub-process in an alarm group.

15. The method as claimed in claim 14, wherein the correlation of each process state with the generadeable alarm information, the allocation of the first value or the second value to each pair as a correlation value, the determination of the current operating state of the process plant, and the disabling of the display of the alarm information are executed separately for each sub-process.

16. A Process plant, comprising:
a number of alarm signaling devices at a process level to generate a number of alarm information for displaying improper operating procedures of the process plant;
an alarm display device to display alarm information;
a status module associated with a sub-group of alarm signaling devices to determine at least one current process state of the process plant from a number of defined process states; and
an alarm processing system at a process control level:
to receive the generated alarm information and a status signal representing the determined process state,
to correlate each defined process state with the total of all received alarm information, wherein a first value or a second value as the correlation value to each pair formed from a process state is allocated, and wherein the alarm processing system controls the alarm signaling device to hide alarm information to which the first value is allocated as the correlation value, based upon the status signal.

17. The process plant as claimed in claim 16, wherein the alarm processing system comprises at least one configuration matrix to correlate the process states and the alarm information.

18. The process plant as claimed in claim 17, wherein a first dimension of the configuration matrix is formed based upon the defined process states and a second dimension of the configuration matrix is formed based upon the alarm information, and wherein the correlation values constitute entries in the configuration matrix.

* * * * *